United States Patent
Stumpe et al.

(10) Patent No.: US 6,448,761 B1
(45) Date of Patent: Sep. 10, 2002

(54) ANGLE OF ROTATION SENSOR WITH AN ASYMMETRICALLY POSITIONED PERMANENT MAGNET

(75) Inventors: Reinhard Stumpe, Neuhausen; Anton Grabmaier; Martin Osterfeld, both of Bietigheim-Bissingen, all of (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 09/446,692
(22) PCT Filed: Jun. 18, 1998
(86) PCT No.: PCT/EP98/03739
§ 371 (c)(1), (2), (4) Date: Dec. 21, 1999
(87) PCT Pub. No.: WO98/59212
PCT Pub. Date: Dec. 30, 1998

(30) Foreign Application Priority Data
Jun. 24, 1997 (DE) .......................... 197 26 691

(51) Int. Cl.[7] ................................. G01B 7/30
(52) U.S. Cl. ................. 324/207.2; 324/207.25
(58) Field of Search .................. 324/207.2, 207.21, 324/207.22, 207.25, 174; 338/32 R, 32 H

(56) References Cited

U.S. PATENT DOCUMENTS

| 4,458,184 A | 7/1984 | Kawate | 318/254 |
| 4,704,567 A | * 11/1987 | Suzuki et al. | 318/254 |
| 5,341,097 A | 8/1994 | Wu | 324/207.2 |
| 5,781,005 A | * 7/1998 | Vig et al. | 324/207.2 |
| 5,861,745 A | * 1/1999 | Herden | 324/207.2 |

FOREIGN PATENT DOCUMENTS

| EP | 575 971 | 12/1993 |
| GB | 2 308 891 | 7/1997 |

* cited by examiner

Primary Examiner—Jay Patidar
(74) Attorney, Agent, or Firm—Paul Vincent

(57) ABSTRACT

The invention pertains to an angle of rotation sensor, wherein a magnet that is arranged such that it can be turned relative to a sensor that is sensitive to magnetic fields is coupled with a rotatable body, the angle of rotation (α) of which needs to be measured. The invention aims to significantly broaden the measuring range of such an angle of rotation sensor. The invention proposes to utilize an asymmetric magnetic field such that the maximum and the minimum of the magnetic field measured by the probe are spaced apart by an angular range in excess of 270°. Advantageous additional developments pertain to other options for adapting the magnetic field to the desired shape. These options include an air gap that changes over the angle of rotation and the utilization of asymmetric pole shoes.

20 Claims, 5 Drawing Sheets

ANGLE OF ROTATION SENSOR WITH AN ASYMMETRICALLY POSITIONED PERMANENT MAGNET

BACKGROUND OF THE INVENTION

The invention pertains to an angle of rotation sensor, wherein the rotational position of a permanent magnet is evaluated by at least one Hall element. In sensors of this type, the rotational position of the body, the angular position of which needs to be determined, is coupled with at least one permanent magnet. If the rotational position is changed, the distribution of the corresponding magnetic field is also changed relative to a stationarily arranged Hall element. Consequently, the angular position of the body that is coupled with the permanent magnet can be determined based on the voltage measured on the Hall element.

U.S. Pat. No. 4,829,248 discloses a rotational body in which a series of permanent magnets is arranged on its outer circumference. If this body rotates, the intensity and the direction of the magnetic field that penetrates two Hall elements is changed, wherein the Hall elements are stationarily arranged opposite to the rotating body in the vicinity of the outer circumference. One disadvantage of this measuring arrangement can be seen in the fact that it requires a large number of permanent magnets. In addition, this measuring arrangement is designed merely for evaluating the relative movement between the body surface and the Hall probe. Consequently, an absolute measurement of the position of the body within a small angular range is not possible with the measuring arrangement disclosed in U.S. Pat. No. 4,829,248. U.S. Pat. No. 5,325,005 discloses a synchronous motor, the rotational field of which is controlled as a function of the rotational position of the armature. In this case, the Hall probes serve as triggers for advancing the rotational field.

In known sensors for angles of rotation which operate with Hall probes, a value for the angle of rotation of approximately 180° lies between the positive and the negative maximum of the measured magnetic flux, and consequently of the voltage delivered by the Hall probe. If the measurement is carried out over a range that exceeds 180°, the measured values may be ambiguous. For an angular value that exceeds 180°, a definitive measurement result can be obtained by utilizing two or more Hall probes. However, this method requires a larger number of Hall probes, i.e., the expenditure for the corresponding evaluation is also increased. The invention aims to disclose an arrangement that makes it possible to measure the angle of rotation over an angular range that by far exceeds 180°, namely with the least possible technical expenditure and, in particular, a small number of Hall probes.

SUMMARY OF THE INVENTION

The invention, in principle, proposes to provide the rotatable magnet with a yoke that essentially surrounds the magnet in circular fashion, and to design and/or rotationally arrange the magnet (with or without pole shoes) within the yoke in such a way that it delivers definitive measuring results over a measuring range that by far exceeds 180°. In this context, the term yoke refers to a stationary, magnetically conductive body that surrounds the magnet and forms a path for the magnetic flux emerging from the magnet which has a superior magnetic conductivity. In this respect, the yoke acts similarly to the stator of an electric motor. However, the yoke simultaneously fulfills a shielding function with respect to possible external electromagnetic interference fields. In this case, the yoke does not necessarily have to be designed circularly. The yoke may also have a different shape as long as it is able to increase or keep the angular measurement range of the angle of rotation sensor large. The yoke may, for example, have an elliptical inner contour. However, it is essential to the invention that all possible measures which produce the largest possible angular range between the measured maximum and the measured minimum of the magnetic flux be combined with one another, wherein the angular range to the next maximum is correspondingly shortened within the adjacent measuring range because the original position of the angle of rotation sensor is naturally reached again after 360°.

Consequently, the measures according to the invention consist, in principle, of designing the angle of rotation sensor in an asymmetric fashion such that an angular range is formed in which the maxima lie as far apart from one another as possible. In a particularly simple measure for achieving this objective, the magnet is arranged to be offset relative to its rotational axis. In addition, the rotational axis of the magnet may also be arranged to be offset relative to the rotational axis of the body, the rotational movement of which needs to be measured. However, this is not necessary. If both axes are aligned with one another, a simpler mechanical construction is attained such that the magnet and the body, the rotational movement of which needs to be measured, can be arranged on a common axis. The mechanical construction can be additionally simplified by aligning the central axis of the yoke with the rotational axis of the magnet which may also be aligned with the rotational axis of the body to be measured. With respect to the magnet, it can be generally stated that this magnet may be magnetized throughout or provided with pole shoes that direct the magnetic flux of the core magnet to the yoke via an air gap in suitable fashion within the yoke space. In order to maintain the magnetic resistance for the magnetic flux at a minimum, the air gap between the magnet and the yoke or between the pole shoe and the yoke, respectively, should be maintained as small as possible over the entire angle of rotation. With respect to the offset position of the magnet relative to its rotational axis, the magnet may be arranged in such a way that its flux within the magnet core extends radially to the contour of the adjacent yoke region or tangentially thereto. These indications may also refer to the rotational axis of the magnet, i.e., the inner magnetic flux either extends radially to the rotational axis or tangentially thereto. In the present embodiment, a radial orientation of the magnetic flux is proposed. However, if deemed practical with respect to the other components of the angle of rotation sensor according to the invention, it is also possible to choose a tangential internal magnetic flux or to define an intermediate position for the magnet which lies between the radial and the tangential arrangement.

If the magnet is arranged to be radially offset from its rotational axis and a radial internal magnetic flux is chosen for the magnet core, one realizes an embodiment which is characterized by a high flux density within the yoke.

A particularly simple mechanical arrangement is defined by a body, the contour of which is arranged to be circularly symmetrical within the yoke, but causes a highly asymmetric magnetic field to result which contributes significantly to improving the desired result.

In a particularly simple design for a magnet that preferably does not have pole shoes, the magnet has an essentially circular or annular cross section. If the magnet has an annular cross section, the magnetic field is preferably aligned by providing the ring with two radially magnetized regions which oppose one another, wherein one region extends over a much larger angle than the other region. Due to this measure, the desired asymmetric distribution of the flux over the yoke circumference is achieved with a correspondingly asymmetric distribution of the radially extending field within the air gap between the magnet or pole shoe and the inner contour of the yoke.

Another principle for attaining the desired asymmetry is defined by an arrangement which contains a permanent magnet that may be arranged centrally with reference to the rotational axis of the magnet or radially offset thereto. This permanent magnet usually has only one continuous magnetization that extends to one side. In order to attain or improve the desired asymmetry of the magnetic flux or adapt this asymmetry of the magnetic flux to the corresponding requirements, the permanent magnet is provided with pole shoes that are preferably realized in the shape of sectors of a circle. In order to attain, improve and adapt to the corresponding requirements of the desired asymmetry, the pole shoes extend along the contour of the yoke over a different angular range. Alternatively or additionally thereto, the outer surface of the pole shoe, which is situated opposite to the inner contour of the yoke, may be provided with a different curvature such that the width of the air gap between the pole shoe and the inner surface of the yoke changes over the circumferential angle.

The measuring range can, as initially mentioned, be increased by utilizing two or more Hall probes. A particularly sensitive measurement can be achieved in the case where the Hall element or the Hall elements, which are preferably offset relative to one another by 90°, are inserted into the yoke in such a way that they intersect the magnetic flux that extends tangentially at this location. The design of the yoke should, at least within this region, be chosen such that the entire magnetic flux intersects the surface of the Hall element. However, it is not absolutely imperative to radially insert the Hall element into the yoke. In this respect, it is also possible to insert the Hall element or the Hall elements in such a way that the magnetic flux flows radially through the Hall element(s), e.g., as described in U.S. Pat. No. 5,325,005. This means that the Hall elements are stationarily arranged in front of the magnetically conductive yoke, preferably in the air gap.

BRIEF DESCRIPTION OF THE DRAWING

Embodiments of the invention are described below with reference to the figures which show.

DESCRIPTION OF THE PREFERRED EMBODIMENTS

Figure 1:
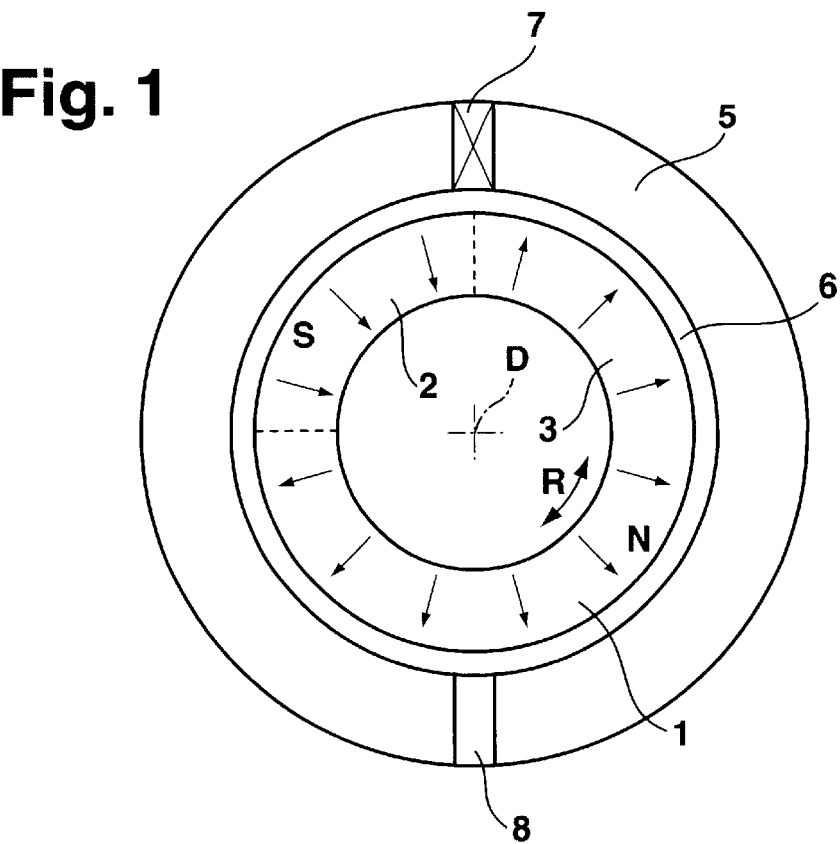
FIG. 1 is a plan view of a first embodiment of the invention in which only one Hall probe is used.
Figure 9:
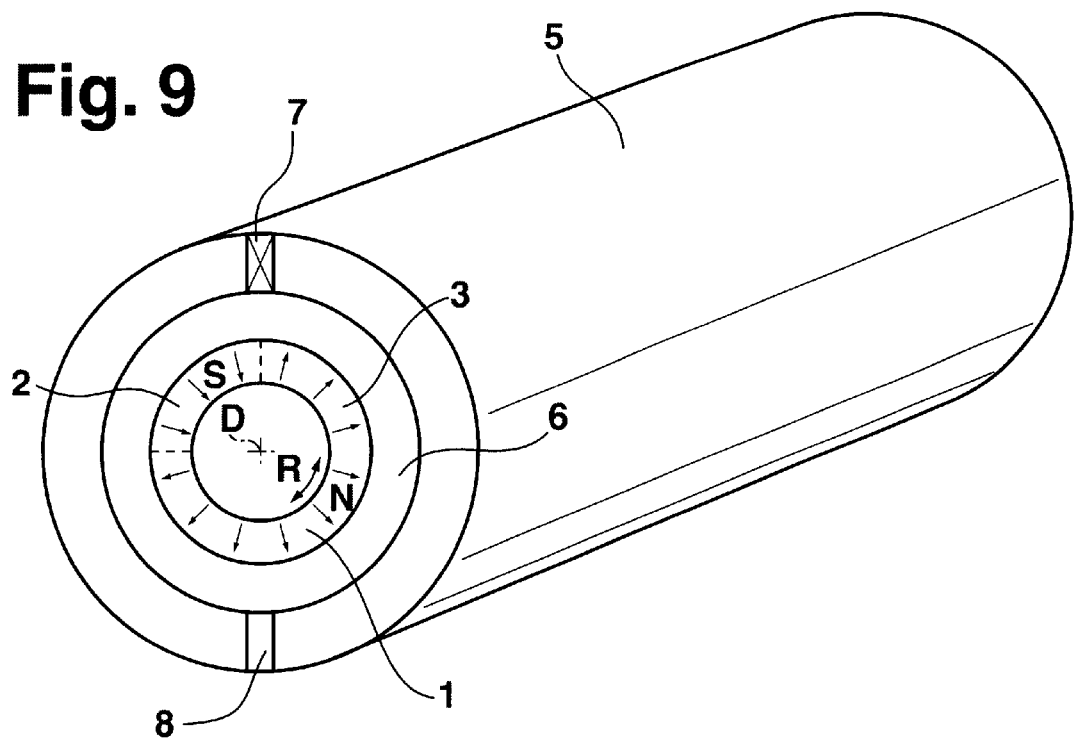
FIG. 9 is a perspective view of the embodiment according to the embodiment shown in FIG. 1 with the yoke 5 having the shape of a hollow cylinder with an elliptical inner contour.

FIG. 9 is a perspective view of the embodiment according to the embodiment shown in FIG. 1 with the yoke 5 having the shape of a hollow cylinder with an elliptical inner contour.

FIG. 1 shows a top view of a permanent magnet 1 that is realized in the form of a hollow cylinder and contains a first magnetization region 2 and a second magnetization region 3. The magnetization direction within region 3 is opposite to the magnetization direction within region 2 as indicated by corresponding arrows. This results in the asymmetric magnetic field to be attained in accordance with the present invention. As mentioned previously, the magnet is realized in the form of a permanent magnet. However, this is not absolutely imperative for the invention. If so required, a magnet that is magnetized by means of a direct current may be used instead of a permanent magnet. However, it is essential that an asymmetric magnetization results, which maintains the definitive measuring range of the angle of rotation sensor according to the invention at the desired size.

The permanent magnet 1 can be turned about the rotational axis that is indicated by D and extends perpendicular to the plane of projection, i.e., the axis D represents the central axis of the hollow cylinder 1. The permanent magnet 1 is surrounded by a magnetically conductive yoke 5 in essentially a circular fashion, wherein said yoke also has the shape of a hollow cylinder. One Hall probe 7 is radially inserted into the yoke 5. An air gap 6 that represents a magnetic resistance is situated between the outer contour of the permanent magnet 1 and the inner contour of the yoke 5. If so required, the yoke 5 may also be provided with an air gap 8, the shape and position of which results from the desired development of the magnetic field, and the precise position of which may have to be determined by experiment.

A person skilled in the art is easily able to ascertain that the configuration shown in FIG. 1 results in an asymmetric magnetic field. In this case, the field lines of the magnetic field extend, for example, from the second region 3 into the yoke 5 via the air gap 6, namely in the direction of the magnetization arrows N, wherein said field lines subsequently extend to the point at which they emerge from the yoke in a fashion not shown. The magnetic field ultimately emerges from the yoke 5 and extends into the air gap 6 approximately on the opposite side of the yoke, after which it extends from the air gap into the first region 2 in the direction of the arrows S. Depending on the shaping of the magnetic field, which depends on the width of the yoke gap 8 and the air gap 6 as well as on the extent of the magnetization regions of the permanent magnet 1 and on other parameters, the embodiment according to FIG. 1 makes it possible to measure an angular range that is by far greater than the conventional angular range of 180°.

Figure 3:
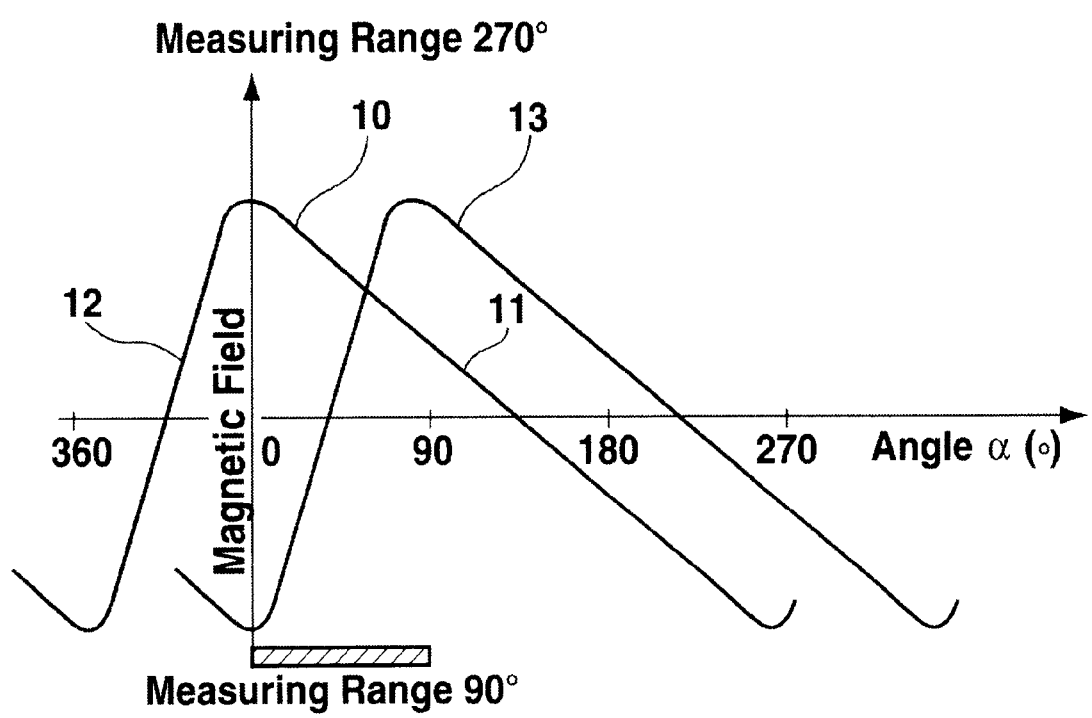
FIG. 3 is a representation of the output signals of the sensors according to FIG. 2.

In FIG. 3, the curve 10 represents the possible progression of the magnetic flux and consequently also the voltage on the Hall probe over the angular range. In this case, it can be determined (if the angle a is correspondingly assumed to have a zero value) that, over a range of 270°, the magnetic flux penetrating the Hall probes 7 continuously decreases as the angular value increases, and finally becomes increasingly negative. This results in a voltage value that continuously changes over an angular range of nearly 270° at the output of the Hall probe, i.e., the measured voltage value clearly defines a definitive angular value within this region. If a measuring range of only 270° is defined, the rotational position of the magnet and consequently the rotational position of the body, the angle of rotation of which needs to be measured, can be directly measured based on the aforementioned voltage value. If one takes into consideration the possibility of also measuring the voltage change as a function of the change of the angle of rotation, it can also be determined in which curve section the measurement is being made based on the different slopes of the curve sections 11 and 12, namely by utilizing the differential of the voltage or the slope of the voltage curve for determining the curve section in which the measurement is being made. This means that a measuring range of nearly 360° can be evaluated under these conditions.

Figure 2:
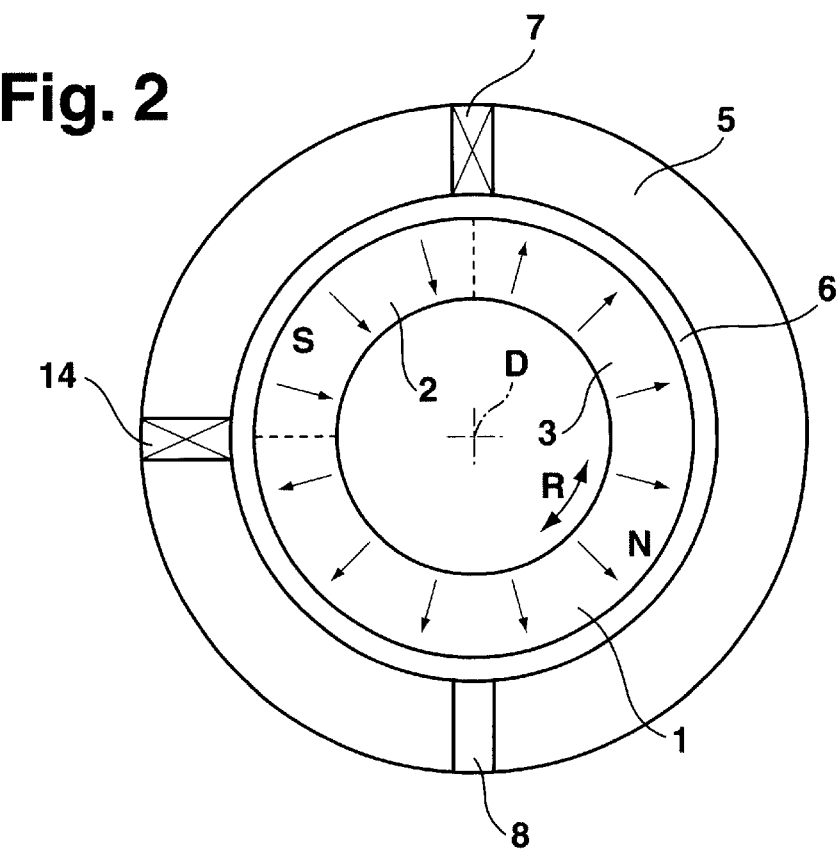
FIG. 2 is a plan view of a second embodiment similar to the embodiment according to FIG. 1, wherein two Hall probes are used.

FIG. 2 shows a second embodiment that merely differs from the embodiment according to FIG. 1 due to the fact that a second element 14, which is sensitive to magnetic fields (i.e., preferably a Hall probe), is inserted into the yoke 5 with an angular offset of 90°. Due to this measure, it is possible to obtain the curve 13 in FIG. 3 which, under corresponding circumstances, can approximately correspond to the curve 10 offset, however, by 90°. If an angular range of only 270° is observed, it can be determined that the curve 13 increases steeply in linear fashion within a measuring range of 90°, wherein the positive slope is significantly greater than the negative slope of the curve section 11 of the curve 10. This effect can be utilized for carrying out measurements with higher sensitivity in a measuring range of 90° within the total measuring range of 270°, with the aid of the second Hall probe 14. In other words, this arrangement makes it possible to carry out a more precise measurement.

Figure 4:
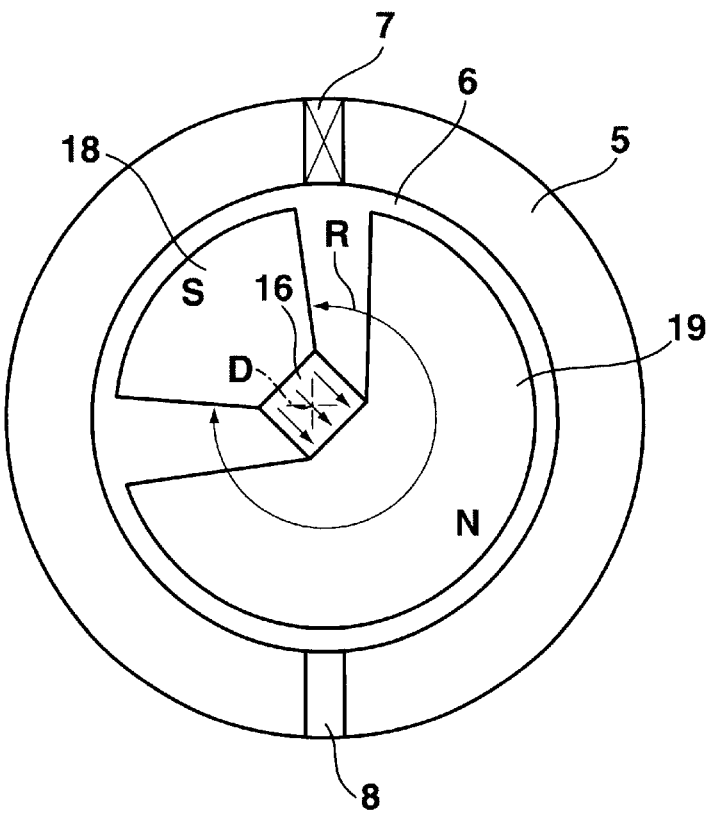
FIG. 4 is a plan view of a third embodiment of the invention.

FIG. 4 shows a third embodiment, in which the yoke 5 is realized identically to that of the first embodiment according to FIG. 1. The block-shaped permanent magnet 16 can also be turned about a rotational axis D in this case, as indicated by the directional arrow R. The block-shaped magnet 16 is magnetized only in one direction. Asymmetric magnetization is attained due to the fact that two pole shoes 18, 19 that have different shapes are attached to the block magnet 16. In this embodiment, the pole shoes essentially have the shape of sectors of a circle, wherein the first pole shoe 18 extends over a smaller sector than the second pole shoe 19. The field distribution is approximately analogous to the field distribution of embodiments 1 and 2, i.e., it can be expected to obtain the curve 10 shown in FIG. 3.

FIG. 4 shows another option for promoting and influencing the asymmetry of the magnetic field by changing the clearance width of the air gap 6 over the angular range. This can be attained by providing the pole shoe 19 with a different curvature than that of the inner edge of the yoke 5, e.g., as shown in connection with the first pole shoe 18. However, it is also possible to shift the rotational axis D of the magnet 16 and consequently of the pole shoes 18, 19 relative to the central axis of the yoke 5 and pole shoe, i.e., to arrange the magnet 16 eccentrically. This is indicated in connection with the second pole shoe 19. Both options can be used individually or in combination as shown in FIG. 4.

In FIG. 4, and as discussed previously, the width of the air gap 6 can be adjusted to support the desired asymmetry of the magnetic flux. This feature is also shown in FIG. 9, where the yoke 5 is shown as a hollow cylinder with an inner elliptical contour. As in FIG. 1, the magnet 1 rotates in either direction indicated by the arrow R around the rotational axis D.

Figure 5:
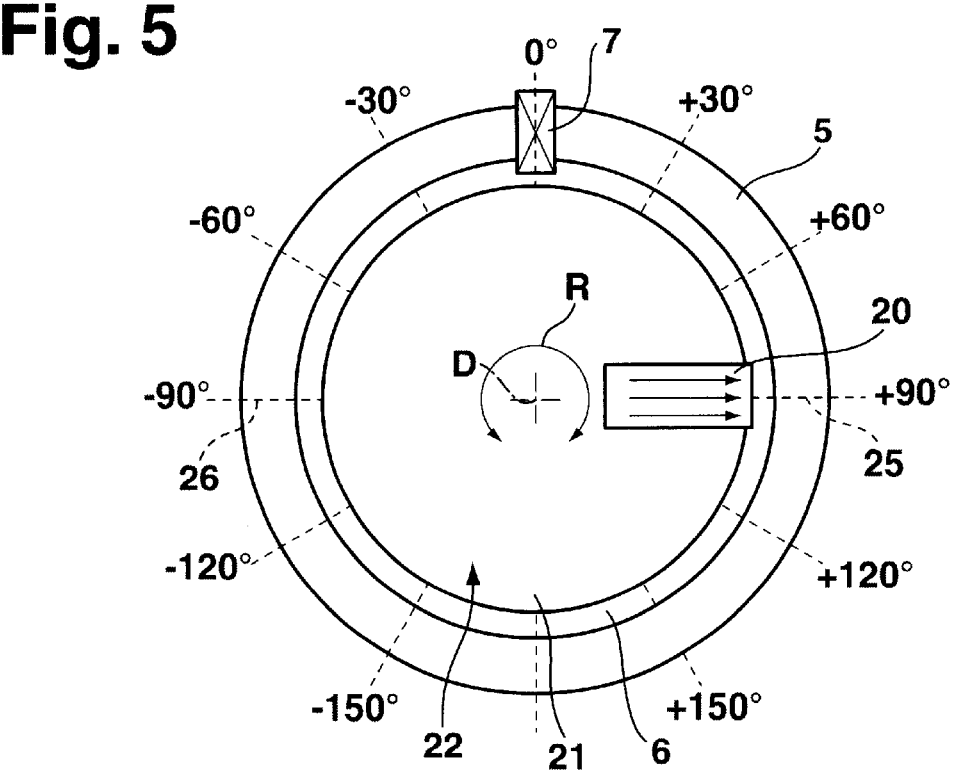
FIG. 5 is a plan view of a particularly advantageous fourth embodiment of the invention.
Figure 6:
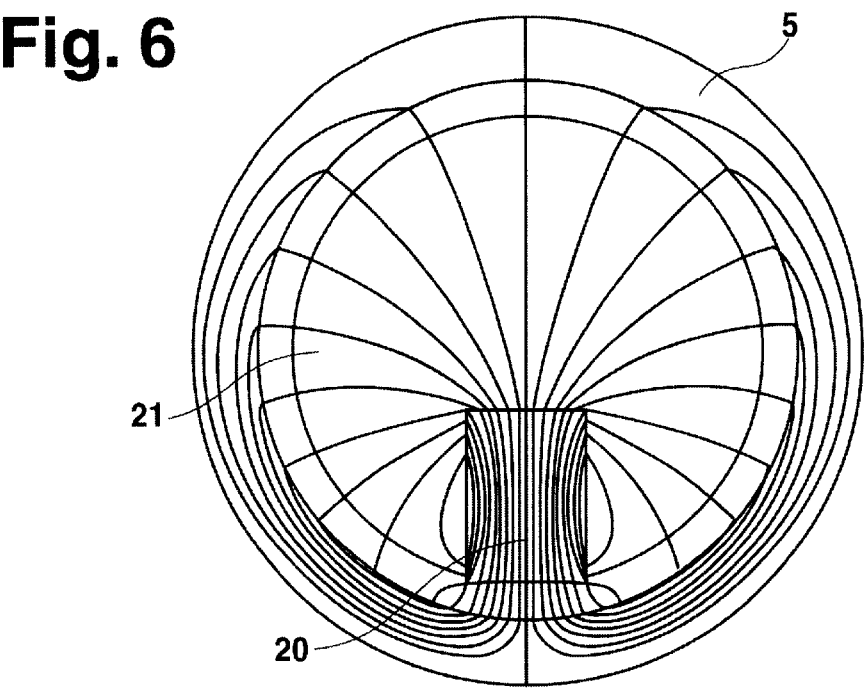
FIG. 6 is a diagram of the field progression of the embodiment according to FIG. 5.

FIG. 5 shows a fourth embodiment which should be particularly emphasized because it inexpensively realizes the desired asymmetric field with a simple design. The unit consisting of the permanent magnet 20 and the pole shoe 21 rotates about the rotational axis D. Although this unit 22 is arranged symmetrically with reference to the rotational axis D and the yoke 5, this does not apply to the magnetic field, which has the desired asymmetric shape. The resulting field distribution is illustrated in FIG. 6 and shows that the flux density within the yoke 5 as well as the flux density within the air gap 6 changes continuously over the angular range. Since the flux decreases continuously over the cross section of the yoke 5 in both yoke halves between the region 25 (in FIG. 5 +90°) and the region 26 (in FIG. 5 −90°), but the magnetization direction in the region 26 simultaneously changes while the rotating direction is preserved, an intense field which extends in the positive direction results in the clockwise direction (see FIG. 6) beginning at +90 (region 25). This field becomes continuously weaker until it is ultimately reversed at −90° and continuously increases up to the region 25 (i.e., up to +90°) in the opposite direction.

Figure 7:
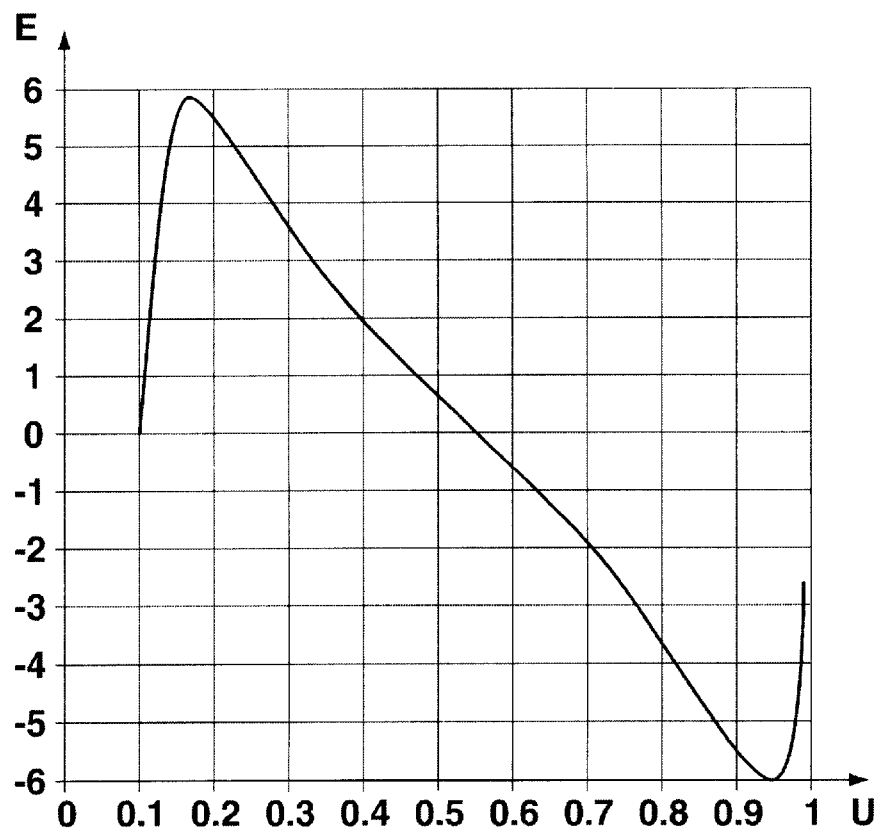
FIG. 7 is a graph depicting the tangential flux within the yoke as a function of the angular position of the magnet.

FIG. 7 shows the progression of the magnetic flux over the circumference of the yoke 5. It can be determined that a progression which changes continuously in the same direction is attained over 8/10 of the circumference, i.e., over approximately 290°. It can be expected that the measuring range can be additionally increased by utilizing additional measures described in this publication. In FIG. 7, the value of the measuring unit is E, which can be interpreted as the magnetic flux or as the voltage on the respective Hall probe, and this is plotted as a function of the circumference U.

Figure 8:
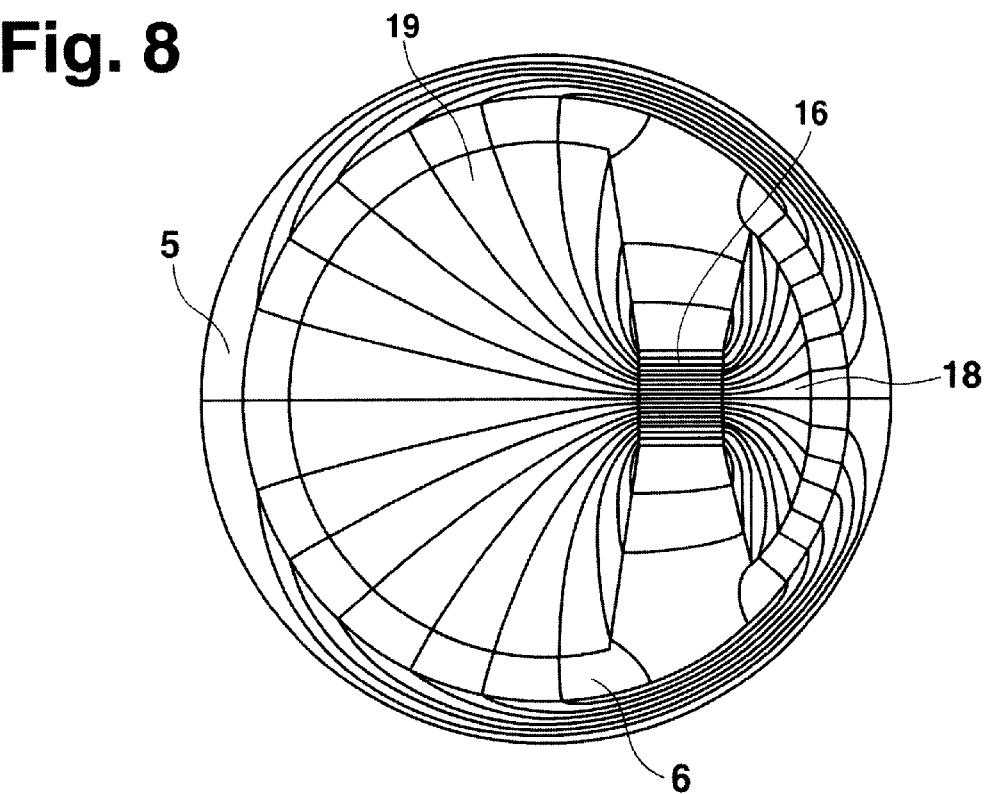
FIG. 8 is an elevation view of an embodiment that is comparable to FIG. 4.

FIG. 8 shows a fourth embodiment which is realized in very similar fashion to the third embodiment of the invention shown in FIG. 4. The essential difference between FIG. 8 and FIG. 4 can be seen in the fact that the clearance width of the air gap 6 above both pole shoes is made identically large, i.e., a very small air gap is produced and the curvature of the outer contour of the pole shoes 18, 19 is essentially identical to the inner contour of the yoke 5. By contrast with FIG. 4, the magnetic field caused by the flux of the magnet 16 is shown in FIG. 8. One can ascertain that the magnetic flux through the cross section of the yoke and in the air gap 6 changes continuously over a very large angular range. Practical experiments have demonstrated that the dependence of the magnetic flux on the circumference is very linear over this angular range, i.e., calibration of the sensor for rotational angles becomes much simpler. According to the invention, it is not absolutely imperative to use a Hall probe for measuring the magnetic field. Other probes which are suitable for measuring magnetic fields may also be used for the present invention. Since the magnetic flux in the air gap changes continuously over a very large angular range in the present embodiment, it may, as described above in connection with U.S. Pat. No. 5,325,005, be practical under certain circumstances to insert the probe into the air gap between the permanent magnet and the yoke 5 or the pole shoe(s) and the yoke 5. However, a diminished magnetic flux which intersects the magnetic field sensor (Hall probe) can be expected in this embodiment of the invention. Since the magnetic flux within the yoke 5 extends perpendicular to the magnetic flux within the air gap 6, the sensor that is sensitive to magnetic fields needs also to be correspondingly aligned.

Consequently, the invention can be summarized as described below:

Conventional rotational sensors which operate on the basis of magnetic fields usually have a maximum measuring range of 180°. This is usually defined by the symmetry of the magnetic circuit. In this type of magnetic sensor, this symmetry is, in particular, defined by the magnetic flux through the magnet and the pole shoes. In the present arrangement, the symmetry is eliminated by an appropriate magnet. An isotropic magnet that was suitably magnetized may, for example, be utilized for this purpose. Alternatively, this magnet may also be composed of several components, i.e., of a magnet and two corresponding pole shoes.

The sensor according to FIG. 5 utilizes a corresponding magnetic circuit which allows a definitive measuring range of up to 330°. FIG. 5 shows the principle of the magnetic field sensor. This sensor consists of a rotating magnet that is arranged eccentrically. The magnet arranged on the rotating shaft is surrounded by a cylindrical pole shoe. A magnetic field sensor now measures the tangential component of the magnetic field in the sensor, i.e., the magnetic flux in the cylindrical pole shoe. In order to measure the tangential flux, one or more magnetic field sensors is/are inserted perpendicular to the circumference of the outer pole shoe.

The advantage of this arrangement can be seen in the superior utilization of the magnetic flux through the outer pole shoe which allows the utilization of relatively small magnets. Another advantage of this sensor is that only simple and inexpensive magnet shapes are required. Only the relative angle between the outer pole shoe with the magnetic field sensor and the inner magnet on the rotational axis is relevant for the function of the sensor, i.e., either the outer pole shoe or the inner magnet rotates.

What is claimed is:

1. An angle of rotation sensor, wherein at least one permanent magnet is rotatable with the rotation of a rotatable body about a rotational axis, an angle of rotation of which needs to be measured, wherein at least one Hall probe is arranged outside of the rotational axis, and the voltage of said Hall probe which is fed to an evaluation unit changes as a function of the angle of rotation of a magnetic field of the magnet, characterized in that the magnetic field of the magnet extends between the poles of the magnet through a yoke that surrounds the magnet, and in that the permanent magnet is arranged such that a width of an air gap between an outside edge of the magnet and the yoke varies over the outside edge of the magnet, and the Hall probe detects a magnetic flux that continuously changes in one direction over an angular range of at least 250° during rotation of the rotatable body.

2. An angle of rotation sensor according to claim 1, characterized in that the magnet is eccentrically arranged with respect to a central axis of the yoke.

3. An angle of rotation sensor according to claim 1, characterized in that the yoke has the shape of a hollow cylinder with an elliptical inner contour, the longitudinal axis of the cylinder aligned with the rotational axis.

4. An angle of rotation sensor according to claim 1, characterized in that the permanent magnet is provided with a pole shoe, and the pole shoe is realized mirror-symmetrically with reference to a plane that extends transverse to the flux direction of the permanent magnet and includes the rotational axis.

5. An angle of rotation sensor according to claim 4, characterized in that the pole shoe essentially has the shape of a circular cylinder, and a radially oriented recess that accommodates the magnet, the magnetic flux of which is also oriented in the radial direction, is arranged in the outer surface of the pole shoe.

6. An angle of rotation sensor according to claim 1, characterized in that the permanent magnet is provided with a pole shoe, an axis of the pole shoe aligned with the central axis of the yoke.

7. An angle of rotation sensor according to claim 1, characterized in that the permanent magnet has the shape of a cylinder or hollow cylinder, which has a circular cross section.

8. An angle of rotation sensor according to claim 7, characterized in that the permanent magnet is in the form of a hollow cylinder having a magnetization that extends radially within the magnet body, wherein the magnetization that is oriented in the direction towards the rotational axis extends over an angular range that differs from that of the oppositely oriented magnetization.

9. An angle of rotation sensor according to claim 1, characterized in that at least one Hall probe is radially inserted into the yoke.

10. An angle of rotation sensor according to claim 1, characterized in that at least one probe is arranged tangentially to the inner surface of the yoke in an air gap situated between the yoke and one of the magnet and the pole shoes.

11. An angle of rotation sensor according to claim 1 wherein the permanent magnet is a block-shaped magnet.

12. An angle of rotation sensor according to claim 11 wherein the block-shaped magnet is mounted in a recess provided in an annular pole shoe.

13. An angle of rotation sensor according to claim 11 wherein the block-shaped magnet is provided with radially extending pole shoes that are in the shape of sectors of a circle.

14. An angle of rotation sensor according to claim 1 wherein the permanent magnet is provided with radially extending pole shoes that are in the shape of sectors of a circle.

15. An angle of rotation sensor according to claim 14, characterized in that the sectors of the pole shoes extend over different angular ranges.

16. An angle of rotation sensor according to claim 14, characterized in that a width of an air gap between an outer edge of each pole shoe and the yoke changes over the outer edge of each respective pole shoe.

17. An angle of rotation sensor, wherein at least one permanent magnet is rotatable with the rotation of a rotatable body about a rotational axis, an angle of rotation of which needs to be measured, wherein at least one Hall probe is arranged outside of the rotational axis, and the voltage of said Hall probe which is fed to an evaluation unit changes as a function of the angle of rotation of a magnetic field of the magnet, characterized in that the magnetic field of the magnet extends between the poles of the magnet through a yoke that surrounds the magnet, and the magnet which is in the form of a permanent magnet is provided with radially extending pole shoes that are in the shape of sectors of a circle.

18. An angle of rotation sensor according to claim 17, characterized in that the sectors of the pole shoes extend over different angular ranges.

19. An angle of rotation sensor according to claim 17 wherein the permanent magnet is a block-shaped magnet.

20. An angle of rotation sensor according to claim 17, characterized in that a width of an air gap between an outer edge of each pole shoe and the yoke changes over the outer edge of each respective pole shoe.

* * * * *